Patented June 22, 1937

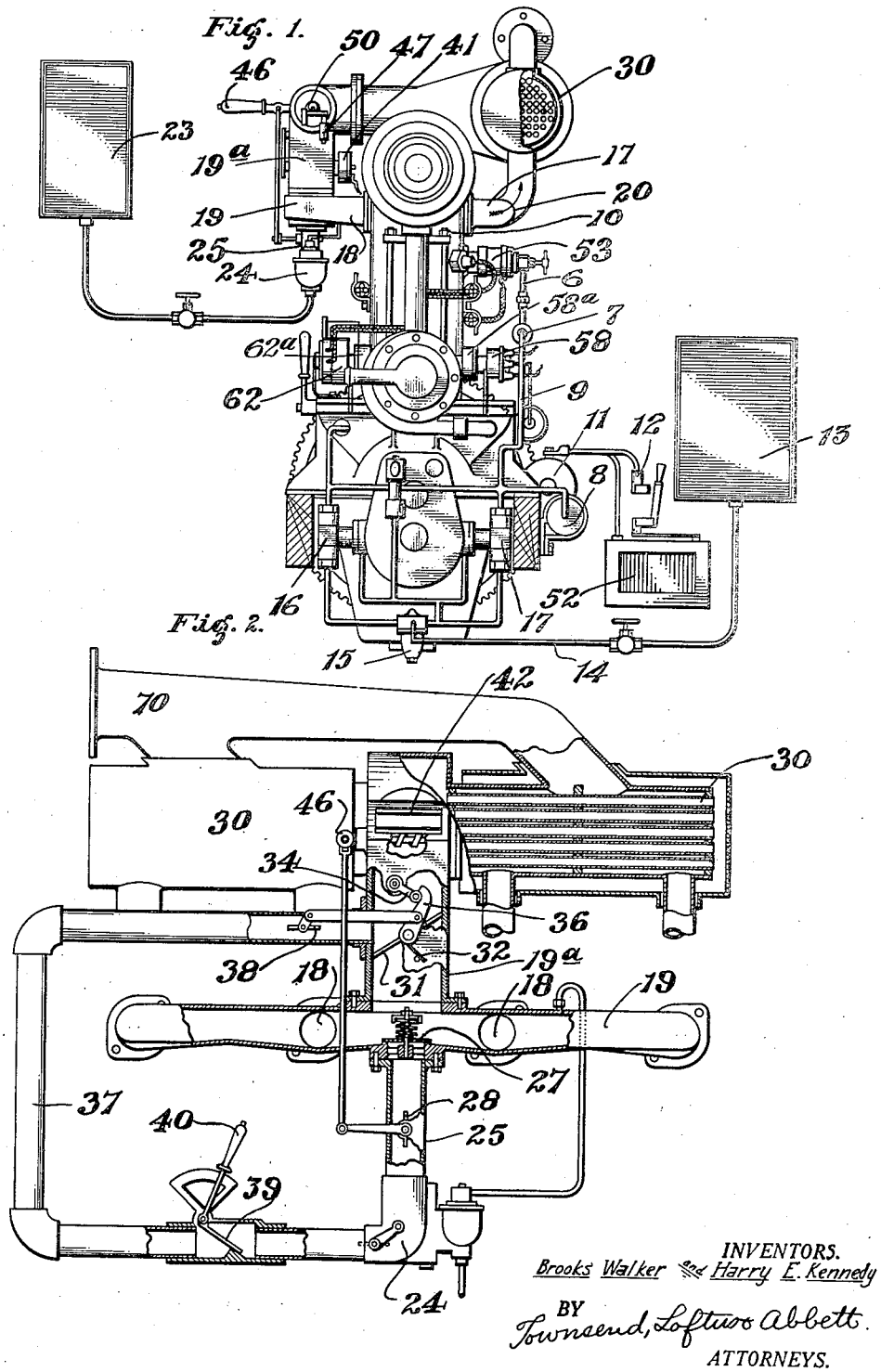

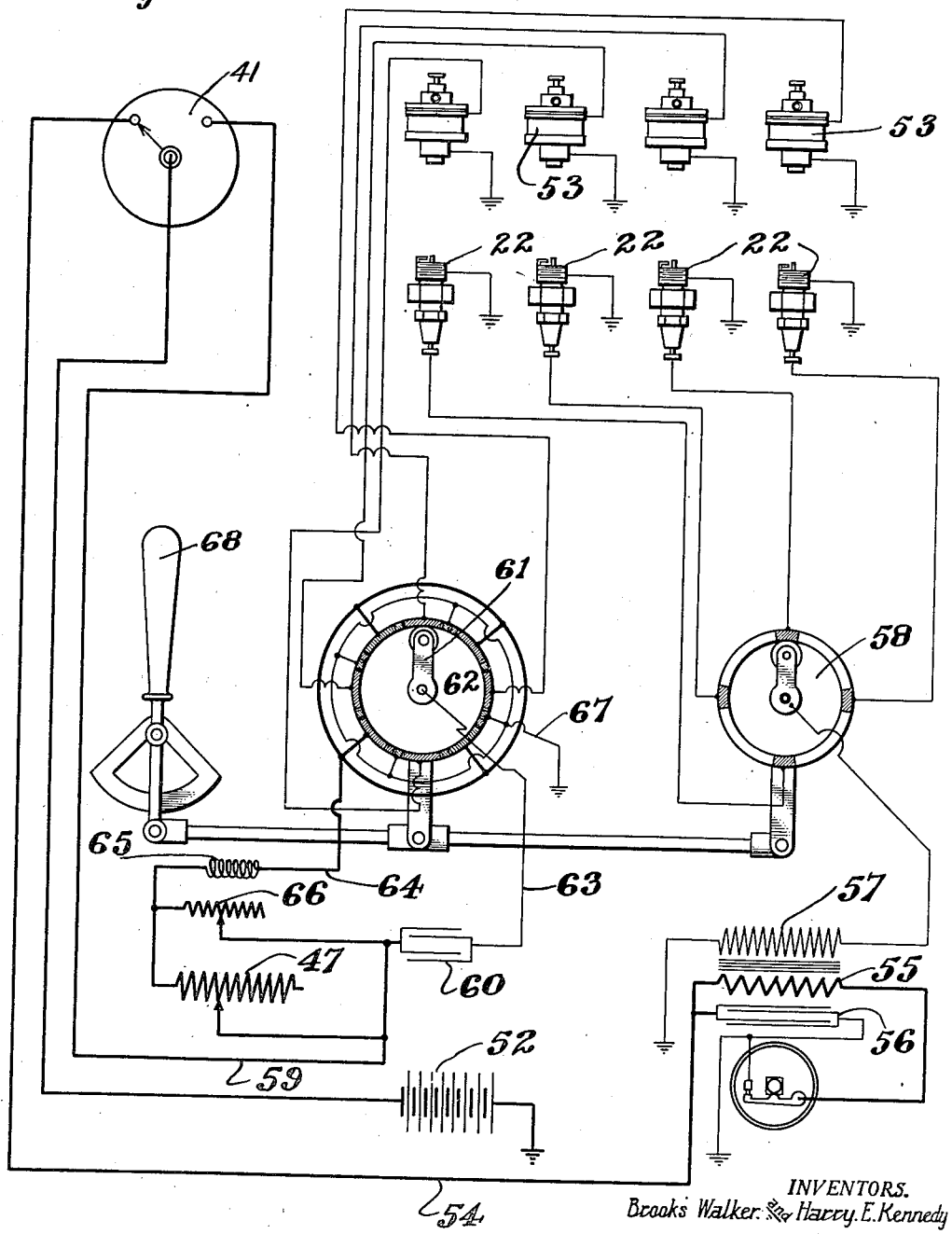

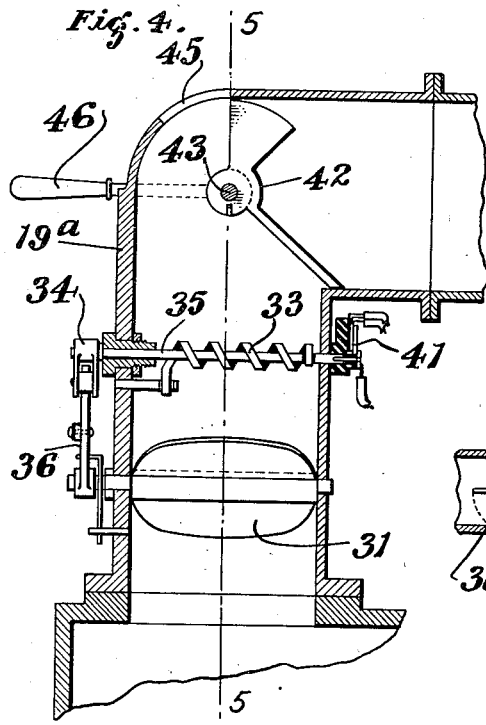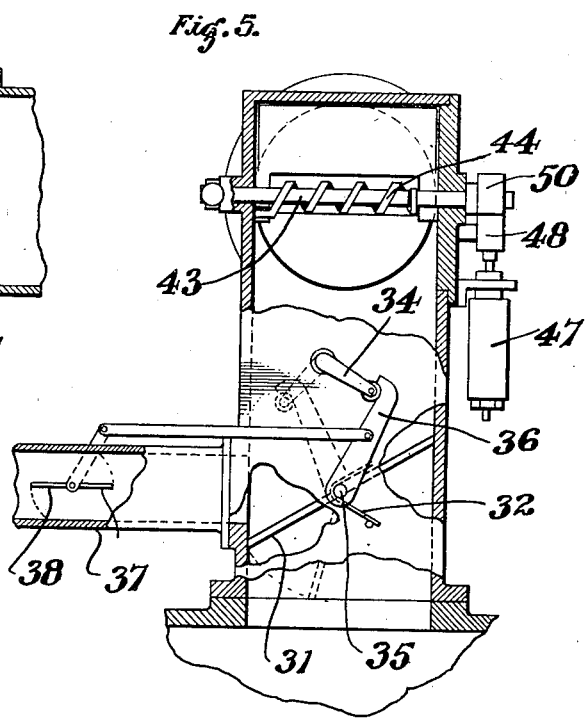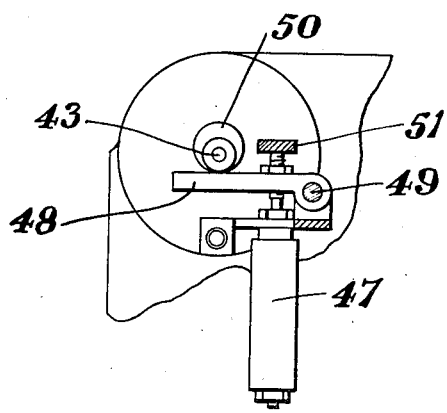

2,084,752

UNITED STATES PATENT OFFICE 2,084,752

INTERNAL COMBUSTION ENGINE

Brooks Walker, Piedmont, and Harry E. Kennedy, Berkeley, Calif.

Application September 9, 1931, Serial No. 561,848

12 Claims. (Cl. 123—127)

This application is a continuation in part of our copending application entitled "Internal combustion engine", filed April 15, 1930, and bearing Ser. No. 444,513.

The invention disclosed in the present application relates to internal combustion engines of a character operating on the auto ignition cycle at comparatively low compression.

It is the principal object of the present invention to provide an improved internal combustion engine having the main desirable characteristic of the so-called Diesel type engine, which is, of course, economy of operation, and those desirable characteristics of engines operating on the more volatile fuels which are flexibility, wide speed range, light weight relative to power output and lack of auxiliary starting operation of costly and undesirable nature.

In practicing the invention, an internal combustion engine is provided which is started on a carbureted mixture with electrical ignition. After sufficient heat is generated by such operation and the delivery of carbureted mixture is discontinued, an injection of fuel oil is commenced so that the engine will operate on auto combustion; instantaneous ignition occurring at a comparatively low final compression pressure prior to top center so that an efficient operating cycle will result.

The invention is exemplified in the following description and illustrated by way of example in the accompanying drawings, in which:

Fig. 1 is an end elevation of an internal combustion engine embodying the preferred form of our invention.

Fig. 2 is an enlarged fragmentary view of the preheater and manifold structure of the engine with parts thereof broken away and in section to more clearly disclose certain details of construction.

Fig. 3 is a diagrammatic view showing the electrical control circuits for the electrical controlled injection system and electrical ignition.

Fig. 4 is an enlarged fragmentary view through the intake manifold showing the valve control mechanisms for controlling the delivery of preheated air to the intake manifold.

Fig. 5 is an enlarged fragmentary view in section with certain parts in elevation taken on line V—V of Fig. 4.

Fig. 6 is an enlarged fragmentary view in elevation of the mechanism including the resistance utilized to produce a throttling effect when the engine is operating on the auto ignition cycle.

Referring more particularly to the accompanying drawings it will be seen that the motor as in standard practice includes the usual cylinders 10 which may be cooled in any suitable manner. Pistons are reciprocably mounted in the cylinders and are, of course, connected to a crank shaft by means of connecting rods as in conventional practice. As this type of construction is old and well known, it is not here illustrated in detail.

The cylinders are each fitted with the usual poppet type intake and exhaust valves which are operated through the medium of an overhead cam shaft in the accepted manner in timed relation to the crank shaft. The intake and exhaust ports controlled by the intake and exhaust valves communicate with intake and exhaust chambers, each connected with manifold risers 17 and 18 formed as a part of an intake manifold 19 and an exhaust manifold 20.

It is intended that the present engine have a compression ratio of approximately seven and one-half. This ratio may be varied within certain limits if desired but was selected as being sufficient to produce a desired final compression temperature and maintain a low final compression pressure. That is to say, a pre-determined final compression temperature is produced by the combined effects of compression, the temperature of retained residual gases and preheated intake air and is sufficient to produce auto ignition at a final compression pressure low enough to eliminate any possibility of the creation of dangerous or destructive pressure rises during combustion.

The final compression pressure in the present engine is approximately two hundred pounds as compared with approximately five hundred pounds in the so-called Diesel type engine. This considerable reduction in final compression pressures enables a light volatile fuel such as gasoline to be used in starting. The use of a carbureted mixture and electrical ignition to start the motor eliminates the use of auxiliaries of an undesirable character such as are employed in connection with high compression Diesel engines. Due to the comparatively low compression ratio in the present engine, high compression pressures need not be overcome in turning the engine over to start it.

Another feature of the present invention is that the engine may operate entirely on auto ignition and not partly on auto ignition and partly on the Diesel cycle as is common practice. This is due, of course, to the comparatively low final compression pressure due to the low compression ratio which enables instantaneous combustion of the charge which is well known to be more efficient than partial combustion before and partial combustion after top center which is necessary in conventional so-called Diesel engines to prevent destructive excessive pressures from being created due to the high compression ratio.

By eliminating the possibility of the creation of excessive pressures in the combustion chamber, the engine weight may be exceedingly low as compared with output and the engine will lend itself to production standards of the conventional type engines operating on carbureted mixtures with electrical ignition. The low final compression pressure created in the present engine also renders the engine less sensitive to leakage by the rings and valves caused by wear and manufacturing inaccuracies and tolerances.

As previously stated, the motor forming the subject matter of the present invention starts on a carbureted mixture with electrical ignition. To accomplish this, the motor is fitted with a conventional type of electrical ignition system disclosed in Fig. 3 and which will be hereinafter more specifically described. This system includes the usual spark plugs 22, the points of which are disposed in the combustion chambers of the cylinders. A source of gasoline or other light fuel is provided at 23 and is connected with a carburetor 24 which in turn is connected through the medium of a riser 25 to the intake manifold 19. At the junction of the riser 25 and the intake manifold 19 is an open port which is controlled by a spring loaded valve 27, which valve is most clearly illustrated in Fig. 2 and which acts to provide sufficient manifold depression to prevent detonation. This valve also acts to discontinue the flow of carbureted mixture to the manifold 19 when the engine ceases operating on carbureted mixture and electrical ignition and commences operation on auto ignition. This is due, as will be described, to the establishment of atmospheric pressure in the manifold during auto ignition operation.

A throttle valve 28 is interposed in the riser 25 as illustrated in Fig. 2 for controlling the operation of the engine when the same is operating on a carbureted mixture from the carburetor 24.

It is manifest from the foregoing that the engine herein disclosed is sufficiently equipped and has inherent characteristics enabling it to be operated on a carbureted mixture with electrical ignition and it is intended that the engine so operate when starting. It continues operating in this manner until sufficient heat is generated to preheat the intake air so that the latter, when combined with the effects of compression and the temperature of the residual gases, is sufficient to promote efficient auto combustion in the combustion chambers of the cylinders.

It is well known that the compression ratio has a definite influence on the final compression temperature and that the latter decreases as the ratio decreases. Also, the lower the ratio the more residual gas retained in the combustion chamber and consequently the greater the influence of the temperature of the retained gases on the charge, and consequently the greater the temperature at the commencement of the compression stroke. Thus, by utilizing a ratio of say seven and one-half we increase the temperature of the charge at the commencement of compression over the temperature of the charge at the same period in an engine operating at a ratio of say fifteen or thereabouts as in conventional so-called Diesel engines.

In order to obtain efficient auto combustion in an engine having a ratio less than that necessary to produce sufficient final compression temperature by the influence only of compression plus the effects of the temperature of the retained residual gases in the combustion chamber, it is necessary to increase the temperature of the charge to raise the same sufficiently to produce efficient auto combustion other than by compression and the influence of the residual gas temperature.

As previously stated, in the present instance the intake air is preheated to supply this deficiency and we utilize the exhaust heat to preheat the air to a degree to create a predetermined final compression temperature. The intake air is admitted to the combustion chambers at a pressure no greater than atmospheric and is not injected under pressure through the medium of auxiliary apparatus, the provision of which has, of course, many manifest disadvantages. The temperature of this intake air is sufficient to maintain the final compression temperature at a predetermined degree and insure maximum volumetric efficiency.

It has been determined that a constant final temperature of approximately 1100° F. will produce efficient auto combustion and that an increase above this would result in reduction of volumetric efficiency and a decrease from this figure would result in reducing combustion efficiency. Therefore, inasmuch as the temperature of the retained residual gases in the combustion chamber varies as the load varies, it is essential that the temperature of the intake air be regulated to compensate for such temperature variations and maintain the final compression temperature substantially constant.

To accomplish the heating of the intake air and the regulation of its temperature, a heat exchanger 30 of any preferred design is provided which derives its supply of cool air from the atmosphere and which derives heat from the exhaust gases from the exhaust manifold of the motor. It will be noted that the heat exchanger 30 is properly connected with both the intake and the exhaust manifold and that an exchange of heat will be effected between air from the atmosphere entering the exchanger and the exhaust gas and that the heated air will be delivered to the intake manifold in a preheated condition for entry to the intake manifold and thence to the combustion chambers of the cylinders.

The connection between the intake manifold 19 and the heat exchanger comprises a riser 19a which communicates at its lower end with the interior of the intake manifold and at its upper end with the interior of the heat exchanger. The exhaust gases, of course, pass through the heat exchanger and do not mix or in any way contact with the air entering the heat exchanger to be heated and delivered to the engine.

When the engine is operating on a carbureted mixture and with electrical ignition, communication between the intake manifold and the heat exchanger is prevented by means of a shut-off valve 31 which is most clearly illustrated in Figs. 4 and 5. This shut-off valve is, of course, normally closed but is automatically opened when the air from the heat exchanger for delivery to the intake manifold reaches a predetermined temperature.

From Figs. 4 and 5 it will be seen that we have provided a thermally sensitive member 33 which is connected with a trip arm 34, which in turn is operatively associated with the shut-off valve. The trip arm 34 is secured on a shaft 35 which is operated by the thermally sensitive member 33. A trigger 36 is engaged by the trip arm 34, which trigger is secured to the same shaft as the valve 31. A spring 32 normally tends to maintain the valve 31 in wide open position.

When the engine is not operating and the temperatures in the heater are low, the trip arm 34 and the trigger 36 are set in the position shown in Fig. 5. In this position the valve 31 will be so disposed as to prevent communication between the heat exchanger and the intake manifold. However, heated air from the heater may pass through a pipe 37 so as to deliver heated air to the carbureter 24. This pipe is controlled by a valve 38 which is connected to the trigger 36 so that when the shut-off valve 31 is in closed position the valve 38 will be in open position and vice versa.

A separate diluting valve 39 is provided in the air delivery pipe 37 which may be manually controlled by a lever 40.

When the heated air for delivery to the intake manifold has reached a predetermined degree, the thermally sensitive member 33 acts to permit the spring 32 to move the shut-off valve 31 to open position as shown in dotted lines in Fig. 5. This opening movement of the valve 31 is accompanied by closing of the valve 38 so as to shut off delivery of heated air to the carburetor.

A control switch 41 as illustrated in Fig. 4 is connected with the shaft 35, which control switch controls the electrical injection valve circuit and the electrical ignition circuit. In other words when the shut-off valve 31 is in closed position, the electrical ignition circuit is closed and the circuit of the electromagnetic valves is open. This can be ascertained from the diagram in Fig. 3. However, when the thermally sensitive member 33 acts to permit opening of the valve 31, the electrical ignition circuit is opened and the circuit of the electromagnetic valve is closed.

Immediately upon the delivery of the heated air to the intake manifold, the pressure rise therein influences the spring loaded valve 27 to prevent further communication between the carburetor and the interior of the intake manifold.

To regulate the temperature of the intake air admitted to the manifold under atmospheric pressure from the heat exchanger, we have provided a diluting valve 42. This valve operates to regulate the temperature of the intake air so that the same will be at the proper temperature desired for admittance to the combustion chamber. That is to say, the valve 42 operates to reduce the temperature of the intake air by admitting cool air from the atmosphere into the intake manifold to modify the temperature of the heated air from the heat exchanger. This diluting or temperature regulation is, of course, necessary because of the variation of exhaust temperature due to variations of engine load.

The valve 42 is provided with two controls, one of which is thermally sensitive and influenced by the temperature of heated air delivered from the heat exchanger and endeavors to maintain the temperature of the air charge to the intake manifold constant by varying the opening of the valve and consequently the amount of cool air admitted from the atmosphere to the intake manifold to reduce the temperature of the heated air from the heat exchanger.

The diluting valve 42 as illustrated in Figs. 4 and 5 is mounted for rotation on a throttle shaft 43 and is connected thereto by means of a thermally sensitive element 44 preferably wound in a spiral. The valve is of such construction that it will simultaneously shut off the delivery of heated air from the heater and uncover a port 45 in the conduit 19a and vice versa. This diluting valve provides a medium for automatically or manually regulating the temperature of the intake air when the engine is operating on the Otto cycle.

The second control of the valve 42 is a manual one which is operated in conjunction with the throttle to influence the intake air temperature by operation of the throttle. It will be noticed that the manual control includes a lever 46 which is connected with the valve 42 and which is also connected with a valve 28, which acts as a throttle when the engine is operating on a carbureted mixture. The lever 46 is connected with the valve 42 through the medium of the throttle shaft 43.

In the present case, as previously mentioned, electro-magnetic valves are used for injection control when operating on the auto ignition cycle and throttling is effected through these valves which are actuated electrically by a circuit such as disclosed in Fig. 3. These valves are preferably connected with a line pressure fuel injection system. The essential characteristics of the valve circuit are described and claimed in our co-pending application entitled Fuel injection system for Diesel engines, filed September 10, 1930, Ser. No. 480,960.

A variable resistance is incorporated in the valve control circuit and is used as a throttling medium by affecting the operation of the electromagnetically operating valves mentioned. This resistance is here illustrated as a carbon pile resistance 47 which is actuated by a lever 48 which is pivoted at 49 and operatively associated with a cam 50 of suitable shape secured on the throttle shaft 43. The shape of this cam 50 is such as will give the same engine torque on the injection operation as on the carbureted operation at a given throttle setting under all throttle positions. An adjustment 51 is provided to vary the idling speed of the motor. Although we have shown a carbon pile resistance as a throttling medium, it is to be understood that any other form of throttle may be incorporated in connection with the operation of the engine on auto combustion without departing from the invention.

The reason for operating the diluting valve 42 in conjunction with the throttle when operating on the auto ignition cycle is that inasmuch as the throttle position has a bearing on the temperature of the retained residual gases, it is necessary to vary the temperature of the intake air accordingly in order to maintain a predetermined final compression temperature. Therefore, it is manifest that through the medium of the diluting valve 42 and its regulation by the temperature of the heated air and by the throttle position, the temperature of the air charge delivered at atmospheric pressure to the intake manifold will influence the final compression temperature to an extent that it will be satisfactory at idling and full throttle, and such that efficient combustion will result in the combustion chambers when the proper fuel charge is present.

In order that the operation of the valve and throttle may be clearly understood, it is desired to point out that the electromagnetic valves are actuated, of course, in timed relation to the piston operation so that the fuel charge will be injected at the proper time prior to top center for auto combustion as previously pointed out.

The valve circuit which we may employ is clearly illustrated in Fig. 3 and has an inherent self governing feature ideally adapted for engines of this character with a wide speed range. This circuit includes a battery 52 electrically connected with the injection valves 53 and the spark plugs 22, interposed in which connections is the switch 41. The battery is connected with the spark ignition system through the conductor 54 which includes the primary winding 55 of an ignition coil and which is connected by means of a suitable conductor to ground when the contacts are closed in the well known manner. Sparking at the points is reduced by a condenser 56 of relatively small capacity. The secondary winding 57 is operatively associated with the primary in the usual manner and the secondary current is discharged to the different spark plugs 22 by means of a distributor 58.

The circuit of the electromagnetic valves is connected with the battery 52 through the conductor 59 which is connected with a capacity 60. This capacity is sufficient to store sufficient energy to operate the valve. The capacity 60 is connected to the rotating arm 61 of a distributor 62 by means of a conductor 63. As the arm travels around the distributor, the valves are energized on the charging of the capacity 60 and the discharge of the condenser is controlled by means of four segments connected with a conductor 64. This conductor is connected with an inductance 65 and the throttle resistance 47. This resistance 47 together with an additional idling resistance 66 are connected to the battery side of the capacity 60. Four additional contacts are interposed in the distributor between the valve contacts and the discharge contacts and are connected with a conductor 67 which is grounded, thus assuring the complete charge of the capacity 60 irrespective of the variations of the various valves and to further prevent an open circuit in one of the valves from interfering with the operation of one of the others. The rotating arm 61 of the distributor is preferably driven by a suitable mechanism.

The distributors of both the injection and ignition systems are interconnected as illustrated in Fig. 3 so that a common control lever or other element such as illustrated at 68 may be utilized to simultaneously advance or retard the two systems simultaneously. The operation of the distributor 62 and the associated circuit is described and claimed in an application by Harry E. Kennedy, co-inventor here, entitled Electrical switching device, filed August 25, 1931, Ser. No. 559,339.

It is understood, of course, that although we have shown a specific valve and ignition circuit that the present invention contemplates the use of both electrical and mechanical injection and any preferred type of electrical ignition.

In operation of the engine, it is constructed in accordance with the teachings herein. The diluting valve 42 and the shut-off valve 31 on starting will be in the position indicated in Fig. 5. In this position the switch 41 will close the ignition circuit and the injection valve circuit will be open. The throttle valve 28 of the carburetor may then be open sufficiently to admit a proper amount of carbureted mixture to the intake manifold. The engine may then be turned over either manually or by an electric starter 11, which is connected to the battery 52 by the switch 12 or by any other suitable means. At this point it is desired to call attention to the fact that due to the low compression ratio an electric starter may be utilized if desired without excessive battery capacity.

When the carbureted mixture is drawn into the combustion chambers, the engine will operate on the four-stroke cycle with electrical ignition and at a speed determined by the position of the throttle valve 28.

During the operation of the engine on a carbureted mixture and with electrical ignition, the exhaust gases will pass through the heat exchanger and discharge through the exhaust pipe 70 connected with the heat exchanger. Cool air from the atmosphere will be drawn into the heat exchanger to be heated by an exchange of heat with the exhaust gases, which heated air will be delivered through the air manifold 37 to the carburetor to facilitate carburetion.

When the temperature of the air in the heat exchanger reaches a predetermined degree, the thermally sensitive member 33 of the shut-off valve 31 will move the valve 31 automatically to open position. This will be accompanied by closing of the valve 38 in the air manifold 37. At the same time the switch 41 will be actuated to open the ignition circuit and close the injection valve circuit. At the same time the rise in pressure in the intake manifold will prevent the admittance of further carbureted mixture from the carburetor to the intake manifold due to the provision of the spring loaded valve 27.

As the heated air enters the intake manifold, it will be at atmospheric pressure but above atmospheric temperature and its temperature will be regulated not only by diluting the heated air with air from the atmosphere through the port 45 due to the influence of the temperature of the heated air coming directly from the heater but also by the throttle position so that the temperature of the heated air withdrawn into the combustion chambers will be such that the final compression temperatures will be constant.

As the injection valves are placed in operation, fuel will be injected into the combustion chambers just prior to top center. The temperature at this point will considerably exceed that just necessary to ignite the fuel charge so that the combustion will be instantaneous and efficient.

The fuel delivery system includes the tank 13, from which the fuel is delivered through the pipe 14 to the strainer 15, then to the two pump cylinders 16 and 17 of the engine driven pump. From the pump cylinders 16 and 17 suitable piping delivers the fuel to the accumulator 8 and to the manifold 7. From the manifold 7 individual pipes 6 deliver the fuel to the electrically controlled fuel metering valves 53.

From the foregoing it is manifest that we have provided an engine which has the chief desirable characteristics of both oil burning engines and engines operating on carbureted mixtures with electrical ignition and while we have specifically described one embodiment of our invention, it is to be understood that the invention can be embodied in various forms as will be understood by those skilled in the art without departing from the invention as defined in the appended claims.

Having thus described our invention, what we claim and desire to secure by Letters Patent is:

1. In an engine of the character described, means for introducing the intake air to the combustion chamber above atmospheric temperature to raise the final compression temperature to a predetermined degree for efficient auto ignition, a throttle for said engine, a diluting valve mechanism for regulating the temperature of the intake air, an automatic control for said valve mechanism influenced by the exhaust temperature and tending to maintain the temperature of said intake air regulated, and a connection between said valve mechanism and said throttle to actuate said valve mechanism upon changes in throttle position for varying the regulated temperature of the intake air to compensate for variations in the residual gas temperature in the cylinder of the engine and thereby maintain the final compression temperature substantially constant.

2. In an engine of the character described, means for introducing the intake air to the combustion chamber above atmospheric temperature to raise the final compression temperature to a predetermined degree for efficient auto ignition, said means comprising a heater deriving air from the atmosphere and heat from the exhaust of the engine and capable of effecting a heat exchange between the two and directing the heated air to the combustion chamber of the engine, a diluting valve interposed between the heater and the combustion chamber for regulating the temperature of the heated air delivered to the combustion chamber, a thermally sensitive control for said valve influenced by the temperature of the heated air from the heater and tending to maintain the temperature of the heated air delivered to the combustion chamber constant for a given exhaust temperature regardless of atmospheric temperature over a predetermined range of engine speed and regulating said temperature lower when said exhaust temperature is high than when said exhaust temperature is low and vice versa.

3. In an engine of the character described, means for introducing the intake air to the combustion chamber above atmospheric temperature to raise the final compression temperature to a predetermined degree for efficient auto ignition, said means comprising a heater deriving air from the atmosphere and heat from the exhaust of the engine and capable of effecting a heat exchange between the two and directing the heated air from the atmosphere to the combustion chamber of the engine, a throttle for said engine, a diluting valve mechanism interposed between the heater and the combustion chamber and capable of automatic regulation by the temperature of the heated air delivered from the heater tending to maintain the heated air delivered to the combustion chamber regulated, and a connection between said diluting valve mechanism and said throttle whereby changes in throttle position will actuate said diluting valve mechanism and vary the regulated temperature of the intake air so as to compensate for changes in temperature of the residual gases in the cylinder of the engine.

4. In an engine of the character described, means for introducing the intake air to the combustion chamber above atmospheric temperature to raise the final compression temperature to a predetermined degree for efficient auto ignition, said means comprising a heater deriving air from the atmosphere and heat from the exhaust of the engine and capable of effecting a heat exchange between the two and directing the heated air from the atmosphere to the combustion chamber of the engine, a diluting valve mechanism interposed between said heater and the combustion chamber of the cylinder of the engine, said diluting valve adapted to admit heated air from the heater and air from the atmosphere to said combustion chamber under atmospheric pressure, a thermal control for said diluting valve mechanism influenced by the temperature of the air from the heater and capable of admitting air from the heater and air from the atmosphere in regulated quantities so that the average temperature thereof will remain regulated, a throttle for said engine, and a connection between said diluting valve mechanism and said throttle whereby changes in throttle position will be accompanied by actuation of the diluting valve mechanism to vary the average regulated temperature of the intake air delivered to the combustion chamber to substantially compensate for variations in the temperature of the residual gases in the cylinder of the engine.

5. In an engine of the character described, means for introducing the intake air to the combustion chamber above atmospheric temperature to raise the final compression temperature to a pre-determined degree for efficient auto ignition, a thermostatically controlled diluting valve mechanism controlling the temperature of the intake air, a throttle for the engine, a connection between the throttle and said thermostat mechanism whereby a change in the throttle position will be accompanied by operation of said thermostat mechanism to vary the regulated temperature of the intake air to cause said intake air to be maintained at a lower temperature at full throttle than at closed throttle.

6. In an engine of the character described, means for introducing the intake air to the combustion chamber above atmospheric temperature to raise the final compression temperature to a pre-determined degree for efficient auto ignition, a throttle, a thermostatically controlled diluting valve, and means for automatically regulating the temperature of the intake air so as to vary the regulated intake temperature to substantially compensate for variations in the temperature of the residual gases in the cylinder of the engine by a connection between said throttle and said thermostatically controlled diluting valve, said regulation maintaining said intake temperature substantially constant at each given throttle position substantially independent of atmospheric temperature changes.

7. In an engine of the character described, means for introducing the intake air to the combustion chamber above atmospheric temperature to raise the final compression temperature to a pre-determined degree for efficient auto combustion, a throttle for said engine, a diluting valve mechanism for regulating the temperature of the intake air, an automatic control for said valve mechanism influenced by the exhaust temperature and tending to maintain the temperature of said intake air regulated, a connection between said valve mechanism and said throttle to actuate said valve mechanism upon changes in throttle position for varying the regulated temperature of said intake air.

8. A thermostatic regulator for the intake of an internal combustion engine having a throttle means, a connection between said throttle and said regulator, said regulator maintaining said intake air regulated at a substantially constant temperature at each throttle position, substantially independent of atmospheric temperature changes, said regulation maintaining said intake temperature lower at wide open throttle position than at closed throttle position and vice versa.

9. An internal combustion engine including an intake manifold, a throttle, a thermostatically controlled regulator and an associated control valve, both located in said intake manifold, said regulator being interconnected to said throttle, said interconnection effecting the temperature control of said control regulator to regulate said intake temperature to different temperatures at different throttle settings.

10. An internal combustion engine including an intake manifold, a throttle, a thermostatically controlled regulator and an associated control valve, both located in said intake manifold, said regulator being interconnected to said throttle, said interconnection effecting the temperature control of said control regulator to regulate said intake temperature to lower temperatures when said throttle is open than when said throttle is closed.

11. In an engine of the character described having a throttle, means for introducing the intake air to the combustion chamber above atmospheric temperature to raise the final compression temperature to a pre-determined degree for efficient auto ignition, thermostatically controlled means for regulating the temperature of the intake air simultaneously and continuously with all changes in throttle position, a connection between said throttle and said thermostat to control changes in the regulated temperature of the intake air, said intake air being maintained at a lower temperature when said throttle is open than when said throttle is closed, said regulation maintaining said intake temperature substantially constant at each given throttle position substantially independent of atmospheric temperature changes.

12. In an engine of the character described, means for introducing the intake air to the combustion chamber above atmospheric temperature to raise the final compression temperature to a pre-determined degree for efficient auto ignition, said means comprising a heater deriving air from the atmosphere and heat from the exhaust of the engine and capable of effecting a heat exchange between the two and directing the heated air from the atmosphere to the combustion chamber of the engine, a throttle for said engine, a diluting valve mechanism interposed between the heater and the combustion chamber controlled by an automatic thermostatic regulator sensitive to the temperature of the heated air delivered from the heater, said thermostatic regulator tending to maintain the heated air delivered to the combustion chamber regulated at all throttle positions, and a connection between said thermostatic regulator and said throttle, whereby changes in the throttle position will actuate said thermostatic regulator and vary the regulated temperature of the intake air to a different degree at each throttle setting.

BROOKS WALKER.
HARRY E. KENNEDY.